(12) United States Patent
Parikh et al.

(10) Patent No.: US 11,014,231 B2
(45) Date of Patent: May 25, 2021

(54) ROBOTIC DEVICE TASK LEARNING (71) Applicant: FUJITSU LIMITED, Kawasaki (JP)

(72) Inventors: Samir Parikh, San Jose, CA (US); Wing-Yue Geoffrey Louie, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 277 days.

(21) Appl. No.: 15/970,735

(22) Filed: May 3, 2018

(65) Prior Publication Data
US 2019/0337150 A1   Nov. 7, 2019

(51) Int. Cl.
*B25J 9/16* (2006.01)
(52) U.S. Cl.
CPC .............. *B25J 9/161* (2013.01); *B25J 9/163* (2013.01); *B25J 9/1661* (2013.01); *B25J 9/1666* (2013.01); *B25J 9/1697* (2013.01)
(58) Field of Classification Search
CPC ........ B25J 9/1602; B25J 9/161; B25J 9/1628; B25J 9/163; B25J 9/1646; B25J 9/1656; B25J 9/1661
See application file for complete search history.

(56) References Cited

U.S. PATENT DOCUMENTS

2017/0028562 A1\* 2/2017 Yamazaki ................ B25J 9/163
2020/0114506 A1\* 4/2020 Toshev ................. G06N 3/0445

OTHER PUBLICATIONS

Shayan et al., "Why should weights of Neural Networks be initialized to random numbers?", Nov. 2013, https://stackoverflow.com/questions/20027598/why-should-weights-of-neural-networks-be-initialized-to-randormnurnbers (Year: 2013).*
Masson et al. "Reinforcement Learning with Parameterized Actions", Thirtieth AAAI Conference on Artificial Intelligence (AAAI-16), Sep. 5, 2015.
Hausknecht et al. "Deep Imitation Learning for Parameterized Action Spaces", In AAMAS Adaptive Learning Agents (ALA) Workshop, May 2016.
Hausknecht et al. "Deep reinforcement learning in parameterized action space" International Conference on Learning Representations, Nov. 13, 2015.
Sonia Chernova and Andrea L. Thomaz, "Robot Learning from Human Teachers" in Robot Learning from Human Teachers , 1, Morgan & Claypool, 2014, pp. 50.
Lillicrap et al. "Continuous control with deep reinforcement learning" ArXiv e-prints , Sep. 2015.

(Continued)

*Primary Examiner* — Spencer D Patton
(74) *Attorney, Agent, or Firm* — Maschoff Brennan (57) ABSTRACT

A method may include obtaining a task-specific state of a robotic device associated with performing a task by the robotic device. The method may also include mapping the task-specific state to a general state of the robotic device, where the general state may applicable to multiple tasks and may include a variable number of elements. The method may additionally include obtaining a set of generic actions represented by a set of parameters, where the set of generic actions may be used to perform the multiple tasks. The method may also include processing the general state of the robotic device to solve for the set of parameters and to predict a next action in performing the task, where the next action may be selected from the set of generic actions, and performing the next action using the set of parameters solved for.

20 Claims, 6 Drawing Sheets

(56) References Cited

OTHER PUBLICATIONS

Peters, J. (2010), Scholarpedia, 5(11):3698 Retrieved from: http://www.scholarpedia.org/article/Policy_gradient_methods.
Feniello et al. "Program Synthesis by Examples for Object Repositioning Tasks" Intelligent Robots and Systems, IEEE/ RSJ International Conference, Sep. 2014.
Akgun et al., "Simultaneously learning actions and goals from demonstration," Auton. Robot., pp. 1-17, Jul. 2015.
Steil et al., "Situated robot learning for multi-modal instruction and imitation of grasping." Robot. Auton. Syst., vol. 47, No. 2, pp. 129-241, Jun. 30, 2004.
Calinon et al. "On Learning, Representing, and Generalizing a Task in a Humanoid Robot," IEEE Transactions on Systems, Man, and Cybernetics, Part B, vol. 37, No. 2, pp. 286-298, Apr. 2007.
A. Vakanski et al., "Trajectory Learning for Robot Programming by Demonstration Using Hidden Markov Model and Dynamic Time Warping," IEEE Transactions on Systems, Man, and Cybernetics, Part B, vol. 42, No. 4, pp. 1039-1052, 2012.
Pardowitz et al., "Incremental learning of tasks from user demonstrations, past experiences, and vocal comments," IEEE Transactions on Systems, Man, and Cybernetics, Part B, vol. 37, No. 2, pp. 322-332, Mar. 12, 2007.
G. Chang and D. Kulić "Robot task learning from demonstration using Petri nets," IEEE International Symposium on Robot and Human Interactive Communication, pp. 31-36, Aug. 2013.
S. Niekum et al., "Learning grounded finite-state representations from unstructured demonstrations," Int. J. Robot. Res., vol. 34, No. 2, pp. 131-157, Feb. 2015.
M. N. Nicolescu and M. J. Mataric, "Natural methods for robot task learning: Instructive demonstrations, generalization and practice," International Conference on Autonomous Agents and Multiagent Systems, pp. 241-248, Jul. 14, 2003.
A. Mohseni-Kabir et al., "Interactive hierarchical task learning from a single demonstration," IEEE International Conference on Human-Robot Interaction, pp. 205-212, Mar. 2, 2015.

\* cited by examiner

ROBOTIC DEVICE TASK LEARNING

FIELD

The embodiments discussed in the present disclosure are related to task learning for robotic devices.

BACKGROUND

Robotic devices have found usage in a variety of fields, such as manufacturing, scientific experiments, or any other field in which consistent, repetitive actions are used. Robotic devices may also be used in contexts that are unsafe for humans, such as diffusing bombs or working in a toxic environment. However, programming robotic devices can be a time-intensive process.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining a task-specific state of a robotic device associated with performing a task by the robotic device. The method may also include mapping the task-specific state to a general state of the robotic device, where the general state may be applicable to multiple tasks and may include a variable number of elements. The method may additionally include obtaining a set of generic actions represented by a set of parameters, where the set of generic actions may be used to perform the multiple tasks. The method may also include processing the general state of the robotic device to solve for the set of parameters and to predict a next action in performing the task, where the next action may be selected from the set of generic actions, and performing the next action using the set of parameters solved for.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure relates to, inter alia, task learning by a robotic device. A robotic device may learn a set of consecutive discrete actions for performing an overall task on a set of objects. To determine what sequence of actions are to be used to complete the task, the robotic device and/or an associated computing device may utilize a generic state representation to represent the set of objects. The generic state representation may be variable in length, with each element of the generic state representation corresponding to a different object. Using the generic state representation, the robotic device and/or the associated computing device may use a neural network to predict a next action to progress towards completion of the task. In these and other embodiments, the input to the neural network may be the elements of the generic state representing the various objects, and the output may be a probability that a given action for a given object is to be used to complete the task. The highest probability action for a given object may be identified as a next action towards completing the task. After the next action is determined, the robotic device and/or the associated computing device may obtain a generic state representation after completion of the next action. The neural network may again be invoked using the new generic state representation as the input to predict the following action towards completion of the task. Such a process may be repeated iteratively until the set of generic actions used to complete the task may be determined.

The present disclosure may provide a number of benefits to the operation of a computer itself, and to the related field of robotics. With respect to the computer itself, the use of the generic state representation may facilitate the use of a single processing approach that is applicable across multiple tasks for a robotic device, rather than having to program separate processing approach for each individual task. Additionally, by using a generic set of actions that is applicable across multiple tasks, the number of actions that is stored and/or programmed is reduced. Thus, embodiments of the present disclosure may improve the performance of a computer itself.

With respect to improving the field of robotics, the present disclosure may provide improvements in that robotic devices may be able to more efficiently perform multiple tasks that involve different sets of objects and/or different numbers of objects. The variability and flexibility introduced allows robotic devices to operate more efficiently and allows the training of robotics devices to be performed by users who may or may not be trained in programming of robotic devices. For example, using embodiments of the present disclosure, a user may operate the robotic device manually to perform the task and may allow the robotic device to train a neural network that can predict a set actions for performing the task based on observing the manual operation. Thus, embodiments of the present disclosure may improve the field of robotics.

Embodiments of the present disclosure are explained with reference to the accompanying drawings.

Figure 1:
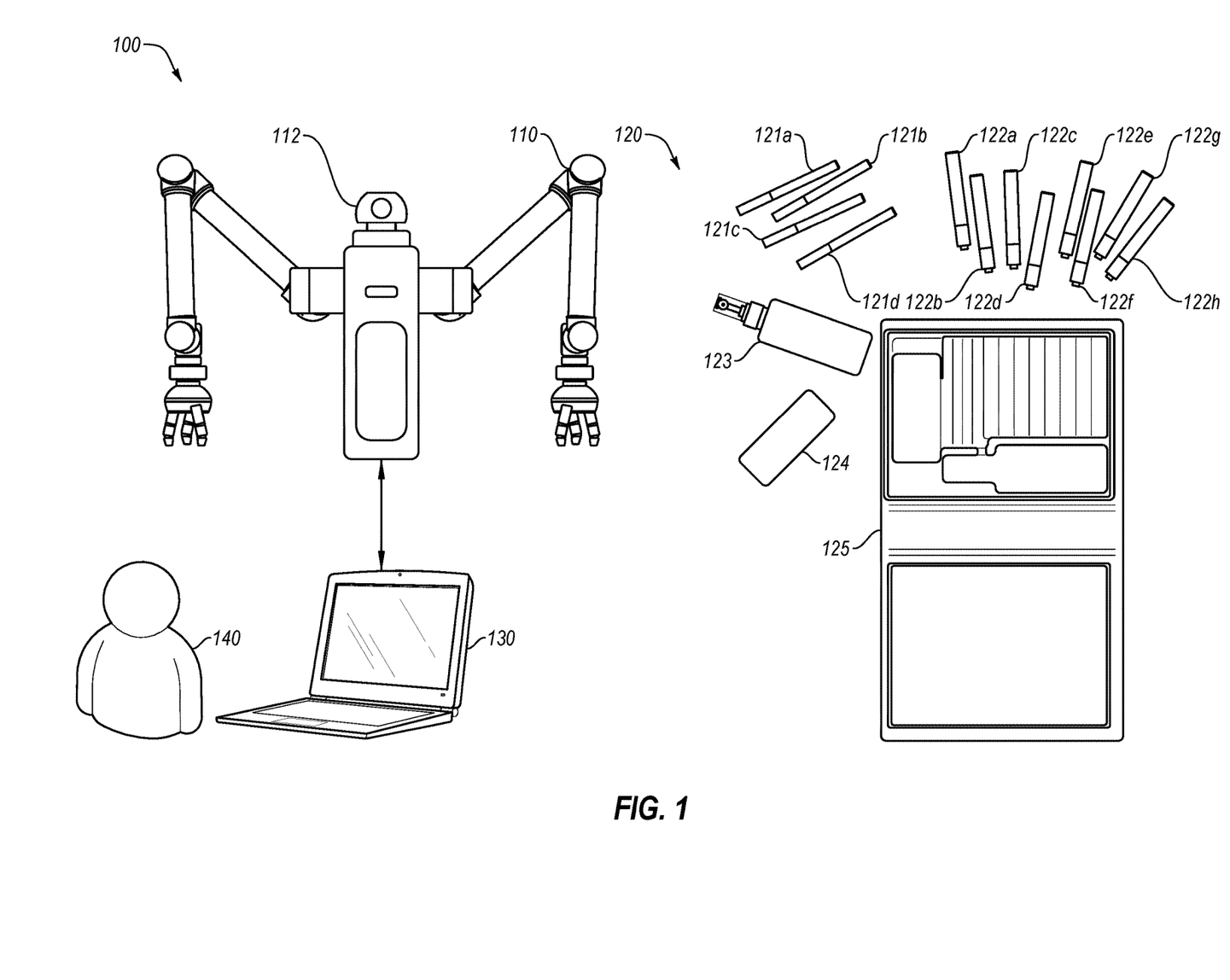
FIG. 1 illustrates an example system for task learning by a robotic device.

FIG. 1 illustrates an example system 100 for task learning by a robotic device 110, in accordance with one or more embodiments of the present disclosure. The system 100 may include the robotic device 110 and a set of objects 120 upon which one or more tasks may be performed. The system 100 may include a computing device 130 as part of and/or in communication with the robotic device 110, and a user 140 that operates the computing device. While certain aspects of the present disclosure may be referred to as being performed by the robotic device 110, it will be appreciated that such aspects may be performed by the computing device 130, for example, when the computing device 130 is implemented as part of the robotic device 110. In some embodiments, the robotic device 110 may identify the set of objects 120, which is a variable set, the number of which may or may not be known beforehand by the robotic device 110. Using the identified objects 120, the robotic device may generate a generic state representation of the state of all of the objects 120. The robotic device 110 may utilize the generic state representation and a generic set of actions to predict which actions are to be performed on each of the objects 120 to accomplish a given task. Using the predicted actions, the robotic device 110 may perform the given task.

As described above, in some embodiments, the robotic device 110 may be configured to learn to perform various tasks that include multiple objects through the use of generic actions. To facilitate the performance of such tasks, the robotic device 110 may utilize the generic state representation that represents the state (e.g., location, orientation, size, etc.) of a number of objects 120 in a task-performing space. In some embodiments, the generic state representation may include a data structure with a series of elements, where each element represents an object 120 and includes data about the object 120. Such data may include an object label, a mesh of the object 120, a set of coordinates for the object 120 in three-dimensional space, and a set of coordinates for the orientation of the object 120. For example, one notation of the generic state representation may be represented by Equation 1.

$$S=\{[l_0,m_0,x_0,y_0,z_0,\text{roll}_0,\text{pitch}_0,\text{yaw}_0], \ldots ,[l_n,m_n,x_n,y_n,z_n,\text{roll}_n,\text{pitch}_n,\text{yaw}_n]\} \quad \text{Equation 1}$$

where S represents the generic state representation; the components of the element with subscript n represents the components of the $n^{th}$ element (e.g., the $n^{th}$ object) of the generic state representation S; l represents the label for the object 120, m represents the mesh for the object 120 (e.g., a mesh representative of the outer surface of the object 120 which may be stored as a distinct file); x, y, and z represent three-dimensional coordinates of the location of the object 120 in space (e.g., the center point of the object 120 in the task-performing space); and roll, pitch, and yaw represent the orientation of the object 120. In these and other embodiments, the various elements of the generic state representation may represent a current state for each of the objects 120. The state representation may change as the robotic device 110 performs actions on the objects 120.

In some embodiments, the robotic device 110 may utilize a camera unit 112 to facilitate identification of the objects 120 and/or the generation of the generic state representation. For example, the camera unit 112 may capture image data of the task-performing space and may perform object recognition and/or localization on the task-performing space to determine the number of objects 120, the location of the objects 120, the identity of the objects 120 (e.g., a marker, a tennis ball, etc.), or any other related tasks. The location detection may be performed according to any technique for object detection and identification, such as edge detection, object association, image comparison/classification, localization, etc. Additionally or alternatively, properties of the objects 120 may be obtained via retrieval from a database based on a barcode scan, a radio frequency identification (RFID) tag reading, etc. In these and other embodiments, the database may store data such as the mesh data of the objects 120.

Using the information regarding the identified objects, an initial iteration of the generic state representation may be generated. The generic state representation may include an element for each of the objects 120 identified in the image data. The other data of the generic state representation may be based on the identified objects in the image data. For example, the object label (l) may be based on a name of the identified object 120, a numerical identifier of the object 120, or any other naming convention to distinguish one object 120 from another. The mesh of the object 120 may be derived based on the image data. Additionally or alternatively, the mesh may be a file identifying the shape and/or surface features of the object 120 and may be stored as a separate file. The three-dimensional coordinates of the location may be based on the location of the center point of the identified object 120 in space as identified by the image recognition. The orientation of the object 120 may be determined from the image data. The derivation of such information may be based on known techniques of image analysis and image recognition.

In some embodiments, the robotic device 110 may utilize a generic set of actions, which when combined/repeated in some order on one or more of the objects 120, may perform each the various tasks. In some embodiments, the process of learning a specific task may include determining the series of discrete generic actions that may result in the robotic device 110 performing the task. Each of the generic actions may be described by a set of parameters for the action. Such parameters may include one or more parameters identifying which object 120 the action is to be performed upon, and/or one or more other parameters that identify characteristics of the action such as the location in the task-performing space of where the action is to be performed. In some embodiments, the generic set of tasks may be programmed by the user 140. Such actions may include a "pick" or "place" action that may correspond to the robotic device 110 either retrieving or releasing a given object 120. For the "pick" or "place" action, the physical parameters may include a set of three-dimensional coordinates (e.g., x, y, z) and an orientation (e.g., roll, pitch, yaw) at which the robotic device 110 is to "pick" or "place" the given object 120. Another action may include a "shift" action that may correspond to the robotic device 110 moving the given object 120 along a directional vector for a given distance. For the "shift" action, the physical parameters may include a directional vector based on a vector from the origin to a given point in the task-performing space as identified by a three-dimensional coordinate (e.g., x, y, z) and a magnitude of distance to move the given object 120 (e.g., a distance, d). Another action may include a "rotate" action that may correspond to the robotic device 110 rotating the given object 120 to a given orientation. For the "rotate" action, the physical parameters may include an orientation (e.g., roll, pitch, yaw). Another action may include a "screw" action that may correspond to the robotic device 110 rotating the given object 120 about a given vector (e.g., screwing on a lid of a bottle). For the "screw" action, the physical parameters may include a directional vector about which the rotation may be performed in the task-performing space as identified by a three-dimensional coordinate (e.g., x, y, z) and a number of rotations (e.g., n) which may be positive or negative depending on the direction of rotation. Another example action may include a "do nothing" action in which the robotic device 110 takes no action with respect to the given object 120. Table 1 illustrates an example table of parameters for the various actions.

TABLE 1

| Action Type | Identifying Parameters | Physical Parameters | Description of Physical Parameter |
|---|---|---|---|
| Pick/Place | 1 | x, y, z, roll, pitch, yaw | Coordinate (x, y, z) and orientation (roll, pitch, yaw) |
| Shift | 1 | x, y, z, d | direction vector from origin to coordinate (x, y, z) for a distance (d) |
| Rotate | 1 | roll, pitch, yaw | target orientation (roll, pitch, yaw) |
| Screw | 1 | x, y, z, n | direction vector from origin to coordinate (x, y, z) around which rotation occurs for a number of rotations (n) |
| Do nothing | — | — | |

In some embodiments, using such generic actions, the number of actions utilized for performing tasks may be reduced. For example, instead of utilizing a different "shift" action for each individual object 120, the same "shift" action may be used across multiple objects 120. In these and other embodiments, the operation of the robotic device 110 and/or the computing device 130 may be improved because the number of actions to be represented, stored, etc. may be reduced by a factor corresponding to the number of objects 120 that share the action.

In these and other embodiments, the generic actions may be utilized to perform any task. Such tasks may include an assembly task, a disassembly task, a packing task, an unpacking task, and a stocking task. In these and other embodiments, each task may be ultimately completed via a series of the generic actions performed on the objects associated with the task.

In some embodiments, the computing device 110 may utilize a neural network to determine the sequence of discrete actions to perform a given task. For example, the neural network may be provided with training data to determine a goal state such that the neural network may be used to derive intervening actions to go from an initial state to the goal state. In these and other embodiments, such training data may be obtained in any of a variety of ways. For example, the user 140 may operate the robotic device 110 to manually perform the given task. In doing so, the robotic device 110 and/or the computing device 130 may capture various states throughout the performance of the given task, including the goal state at completion of the given task. As another example, the robotic device 110 may capture image data while observing the user 140 personally performs the given task. The robotic device 110 may capture various states of the objects 120 throughout the performance of the given task, including the goal state at the completion of the given task.

In these and other embodiments, using such training data, a machine learning model such as a neural network may be configured to determine a next desired state based on the goal state, and thus what the next action and the parameters for that action may be to arrive at the next desired state. In some embodiments, the next desired state may or may not be an unknown as the neural network begins analysis. In these and other embodiments, because the number of objects is variable, the neural network may be modeled as a Long Short-Term Memory (LSTM) network. In these and other embodiments, such a network may utilize LSTM blocks as building units for layers of a recurrent neural network (RNN). The LSTM network may be configured to analyze each of the potential actions for each of the objects 120, and predict a probability for the action for the object 120, as well as potential parameters for the action. Based on the predicted probabilities, an action for an object with associated parameters may be selected as the next action to perform the overall task. The process of prediction using the neural network may be iteratively repeated to select a next action, and a next action, etc. until the goal state is achieved. In these and other embodiments, the neural network may use the state after the selected action as the initial state for the next round of analysis.

An example mathematical representation of the prediction performed by the neural network may be presented in Equation 2, where the current states of each of the objects 120 are fed iteratively into the LSTM network, and a series of action probabilities with physical parameters for the actions are the output.

$$[l_0, x_0, y_0, z_0, roll_0, pitch_0, yaw_0], \ldots ,$$
$$[l_n, x_n, y_n, z_n, roll_n, pitch_n, yaw_n] \rightarrow$$
$$LSTM \rightarrow \begin{bmatrix} a_{00} & \cdots & a_{0n} \\ \vdots & \ddots & \vdots \\ a_{m0} & \cdots & a_{mn} \end{bmatrix} \begin{bmatrix} Y_{a_{00}} & \cdots & Y_{a_{0n}} \\ \vdots & \ddots & \vdots \\ Y_{a_{m0}} & \cdots & Y_{a_{mn}} \end{bmatrix}$$

Equation 2

In Equation 2, $[l_0, x_0, y_0, z_0, roll_0, pitch_0, yaw_0]$ may represent the current state of the $0^{th}$ object in a similar manner as described in S (although without the mesh m), LSTM may represent the LSTM network that performs the prediction based on the current states of the various objects and the goal state, $a_{00}$ may represent the predicted probability associated with $0^{th}$ action for the $0^{th}$ object, $a_{0n}$ may represent the predicted probability for the $0^{th}$ action for the $n^{th}$ object, $a_{m0}$ may represent the predicted probability for the $m^{th}$ action for the $0^{th}$ object, $a_{mn}$ may represent the predicted probability for the $m^{th}$ action for the $n^{th}$ object, $Y_{a_{00}}$ may represent the physical parameters associated with the $0^{th}$ action for the $0^{th}$ object, $Y_{a_{0n}}$ may represent the physical parameters associated with the $0^{th}$ action for the $n^{th}$ object, $Y_{a_{m0}}$ may represent the physical parameters associated with the $m^{th}$ action for the $0^{th}$ object, and $Y_{a_{mn}}$ may represent the physical parameters associated with the $m^{th}$ action for the $n^{th}$ object. In these and other embodiments the length of $Y_{a_{mn}}$ may be the number of physical parameters for the action $m^{th}$ action. For example, if the $m^{th}$ action corresponds to "Rotate" from Table 2, $Y_{a_{mn}}$ may include three elements representing the three physical parameters roll, pitch, yaw.

In some embodiments, the various parameters of the various actions may be randomly selected and some repetitive and/or iterative processing may be utilized to determine a maximum, a minimum, a local maximum, or a local minimum to determine the action with the highest probability. For example, the LSTM network may utilize a reinforcement learning method (e.g., with the goal state used for the reinforcement learning) using a policy gradient algorithm, and rewards based on how closely a new state is to the goal state. In these and other embodiments, the output of the LSTM network may be based on a reward for each action/object pair, where the reward may represent a weighted sum of factors such as success/failure of the action (e.g., does the action cause the object to collide with another object when performing the action), proximity to the goal state upon completion of the action for all objects, etc.

As another example, the LSTM network may utilize a supervised learning approach via a batch gradient descent or a stochastic gradient descent. For example, using such an approach, the LSTM network may iterate over possible values for parameters to find a local maximum and/or minimum for probabilities by changing the values of the parameters by an amount proportional to the gradient (e.g., degree of change).

In some embodiments, after a certain action is predicted by the neural network, an analysis may be performed on the mesh of the object 120 upon which the action is performed. For example, an object collision analysis may be performed by comparing the meshes of each of the objects 120 and the locations of the meshes as the action is performed on the object 120. If it is determined that the mesh of the object will collide with the mesh of another object in performing the action (e.g., if the object 120 will bump into, hit, or otherwise come into contact with another object 120 during performance of the action), the action may be dropped and the next highest probability action may be selected. In these and other embodiments, the object collision analysis may also be performed on the object 120 associated with the next highest probability action. Such a process may be iteratively repeated until the highest probability action without object collisions is found. In these and other embodiments, such an action may be selected as the next action.

By completing iterative processing using the neural network, the series of actions selected may represent the actions for performing a given task. In some embodiments, such processing may be performed using a model of the robotic device 110 and/or the objects 120 such that the processing may be performed without moving the actual robotic device 110 before the discrete actions for performing the task have been selected. Additionally or alternatively, the process may be performed where each action is taken by the robotic device 110 after the action is selected, and the camera unit 112 may capture image data to verify the state of the objects 120 for each iterative selection of the next step.

Modifications, additions, or omissions may be made to the system 100 without departing from the scope of the present disclosure. For example, the system 100 may include any number of computing devices connected in any manner. In many cases, the system 100 may include more computing devices than illustrated and may serve a large number of data sets.

Figure 2:
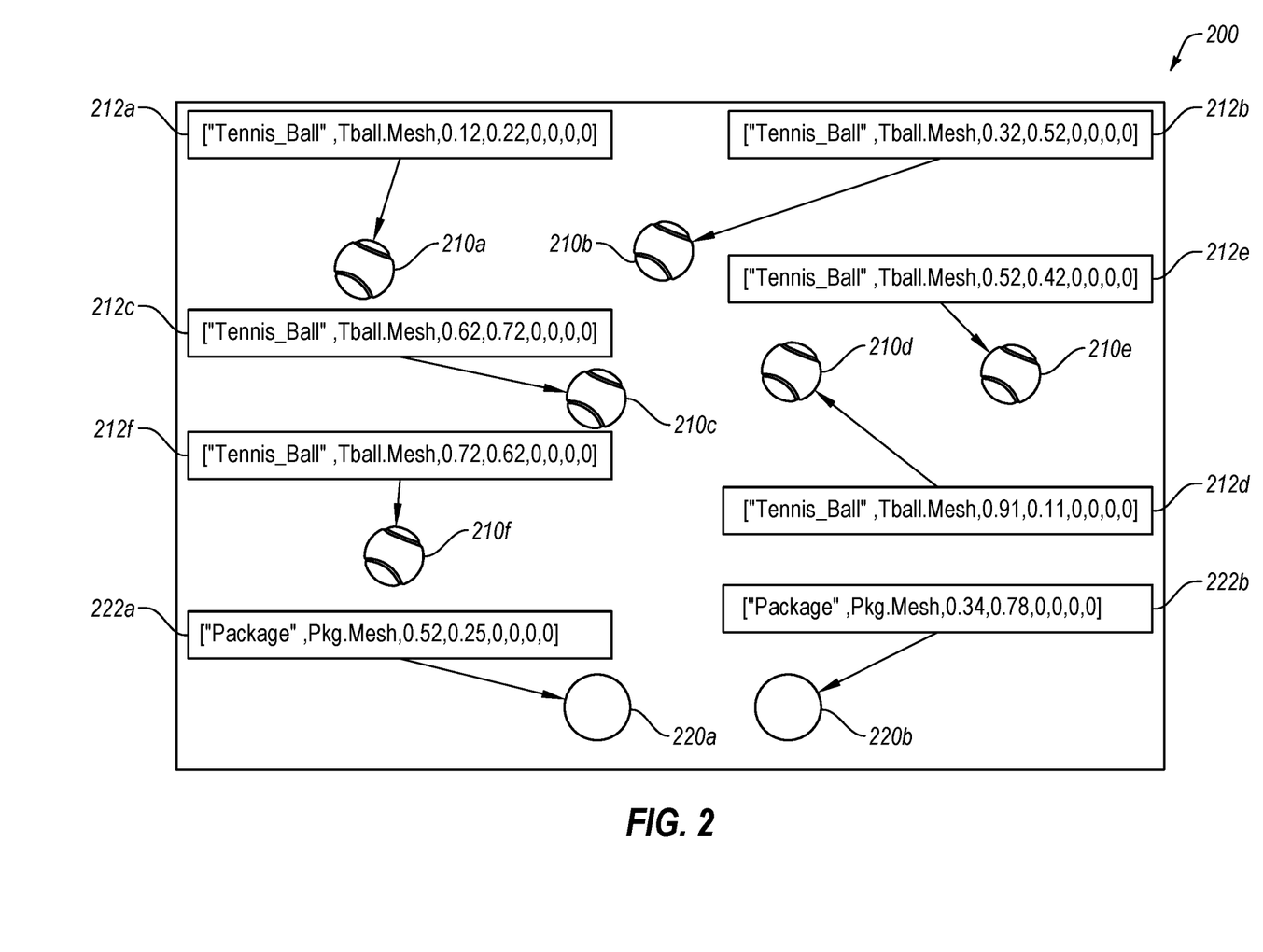
FIG. 2 illustrates an example environment in which a robotic device may perform a task.

FIG. 2 illustrates an example environment 200 in which a robotic device may perform a task, in accordance with one or more embodiments of the present disclosure. The environment 200 may represent the task space described with reference to FIG. 1, and may include multiple tennis balls 210 and packages 220. FIG. 2 also illustrates elements 212 of a general state representation corresponding to each of the tennis balls 210 and elements 222 of the general state representation corresponding to each of the packages 220. The state representations may follow the same or similar notation as that described with reference to FIG. 1.

As illustrated in FIG. 2, the tennis balls 210 (e.g., 210a-210f) may represent some of the objects 120 of FIG. 1. An associated task may include packing the tennis balls 210 into the packages 220. As described above, the robotic device 110 and/or the computing device 130 may perform an analysis to determine what discrete actions to perform in completing the task.

As illustrated in FIG. 2, the elements 212 and 222 may represent the current location and/or orientation of the objects in the environment 200. For example, for the tennis ball 210a, the label for the object may be "tennis ball," and the mesh for the object may be stored in the file "tball-.mesh," as identified in the first two fields of the element 212a. The tennis ball 210a may be located at the coordinates (0.12, 0.22, 0) in the three-dimensional space of the environment 200 as identified in the next three fields of the element 212a. The tennis ball 210a may be in a neutral or reference orientation, as represented by the next three fields of the element 212a (e.g., (0, 0, 0)).

As described above with reference to FIG. 1, a series of actions may be predicted for performing a task (placing the tennis balls 210 into the packages 220) on the objects (e.g., the tennis balls 210). For example, a first action may include a "Pick" action for the tennis ball 210f, followed by a "Shift" action to move the tennis ball 210f to the location of the package 220a, followed by a "Place" action to place the tennis ball 210f in the package 220a. Such actions may be based on the respective actions being predicted by the neural network for each of the respective intervening states.

Modifications, additions, or omissions may be made to the environment 200 without departing from the scope of the present disclosure. For example, the environment 200 may include any number of objects for performing any number of tasks.

Figure 3A:
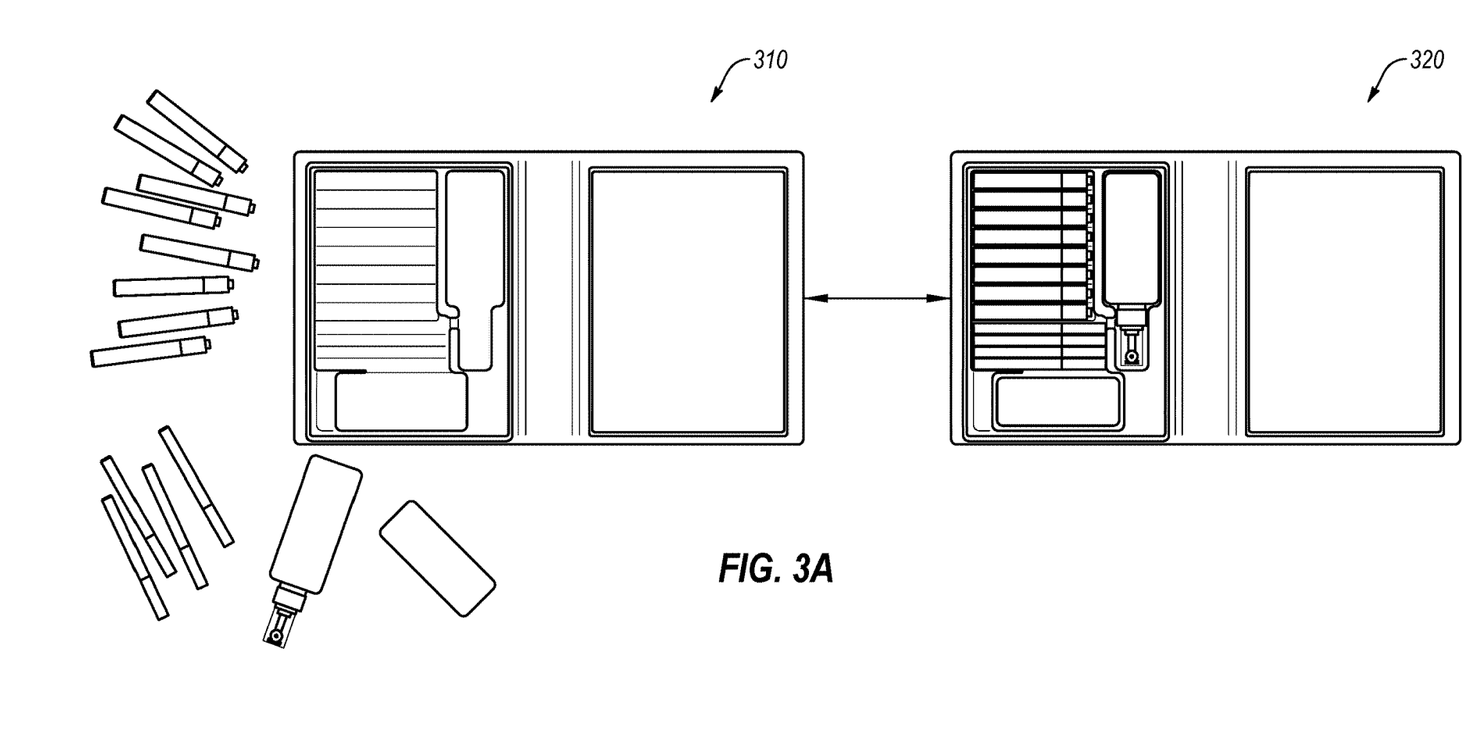
FIGS. 3A and 3B illustrate examples of various tasks that may be performed by a robotic device and/or used in task learning by the robotic device.
Figure 3B:
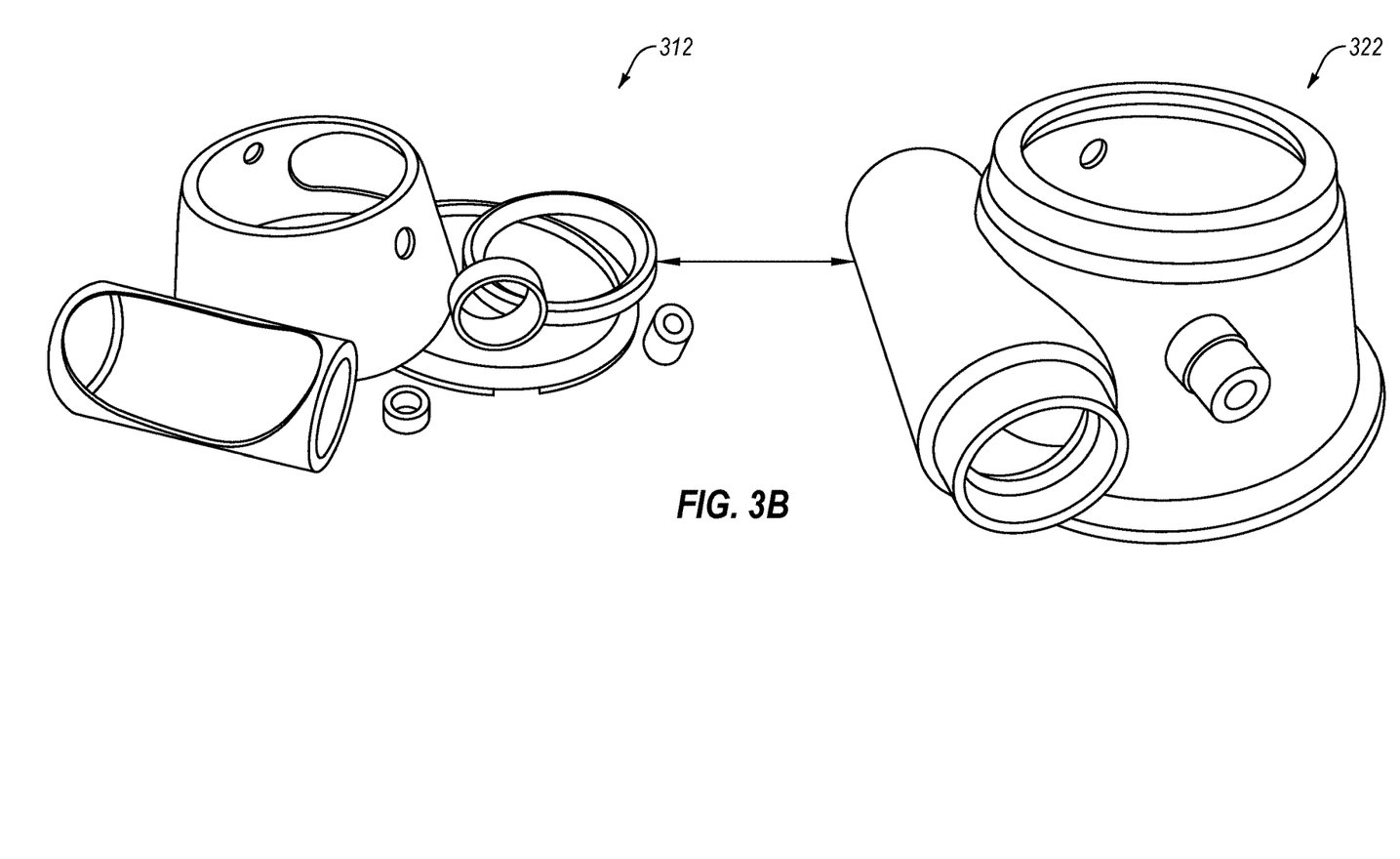

FIGS. 3A and 3B illustrate examples of various tasks 300 (such as the tasks 300a and 300b) that may be performed by a robotic device and/or used in task learning by the robotic device, in accordance with one or more embodiments of the present disclosure.

As illustrated in FIG. 3A, the task 300a may include a task to load a marker set. In before-image 310, the markers are all around and the task to be performed is to place the markers in the case. As illustrated in after-image 320, the markers have been placed in the case.

As illustrated in FIG. 3B, the task 300b may include a task to assemble a machinery part from individual components. In before-image 312, the individual components may be separate. As illustrated in after-image 322, after a series of actions, the individual components may be combined into the machinery part. In these and other embodiments, the various tasks may be predicted by the neural network based on progress towards the goal state as illustrated in the after image 322.

Modifications, additions, or omissions may be made to FIGS. 3A and/or 3B without departing from the scope of the present disclosure. For example, the tasks 300 may include any tasks, such as stocking, assembly, disassembly, packing, unpacking, or any other object-manipulation-based tasks.

Figure 4:
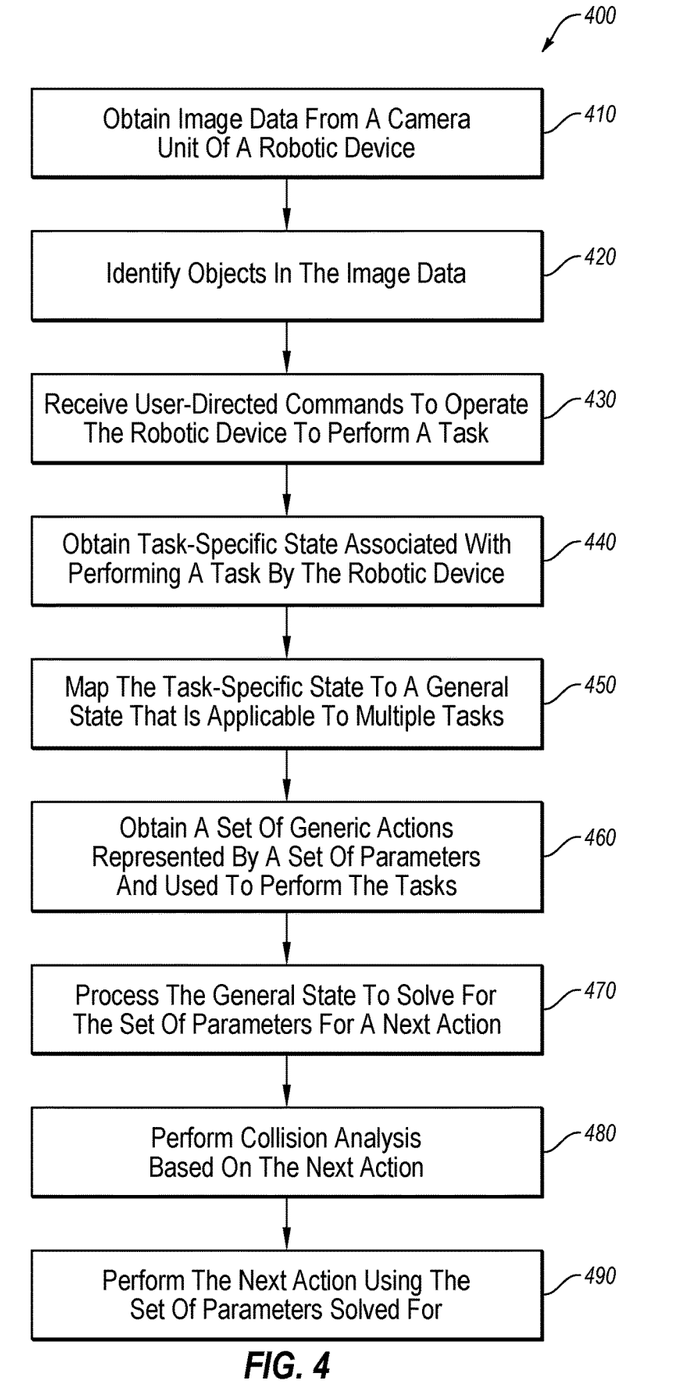
FIG. 4 illustrates a flowchart of an example method of task learning by a robotic device.

FIG. 4 illustrates a flowchart of an example method 400 of task learning by a robotic device, in accordance with one or more embodiments of the present disclosure. The method 400 may be performed by any suitable system, apparatus, or device. For example, the system 100 or any of the robotic device 110, computing device 130, and/or any other device of FIG. 1, or other systems or devices, may perform one or more of the operations associated with the method 400. Although illustrated with discrete blocks, the steps and operations associated with one or more of the blocks of the method 400 may be divided into additional blocks, combined into fewer blocks, or eliminated, depending on the desired implementation.

At block 410, image data may be obtained from a camera unit of a robotic device. For example, a robotic device (such as the robotic device 110 of FIG. 1) may utilize a camera unit (such as the camera unit 112 of FIG. 1) to capture an image of a task space where one or more objects may be located. The objects may be objects upon which the robotic task may be configured to perform a task. Additionally or alternatively, the robotic device may identify the object via reading a barcode or an RFID tag associated with the object.

At block 420, objects in the image data may be identified. For example, object identification and/or localization may be performed on the objects to determine their location and identity within the task space. Such identification may include identifying three-dimensional coordinates corresponding to the location of each of the objects, and an orientation of each of the objects. Additionally or alternatively, such identification may include identifying a label for each object and/or a mesh associated with the object. In some embodiments, the mesh may be derived for the object based on the image data.

At block 430, user-directed commands to operate the robotic device to perform a task may be received. For example, a user (such as the user 140 of FIG. 1) may operate a computing device (such as the computing device 130 of FIG. 1) to give the robotic device manual instructions in performing a designated task. Such a task may include any task based on object manipulation, such as an assembly task, a disassembly task, a stocking task, a packing task, and an unpacking task.

At block 440, a task-specific state associated with performing a task by the robotic device may be obtained. For example, the robotic device may obtain data related to a current state of various objects associated with performing a task. In some embodiments, obtaining the task-specific state may be performed via the operations of the blocks 410 and/or 420. Additionally or alternatively, obtaining the task-specific state may be performed via the operation of the block 430 by capturing various states of one or more objects during the modeling of the task. In some embodiments, the task-specific state may include a rigid number of objects that correspond to the specific task.

At block 450, the task-specific state may be mapped to a general state that is applicable to multiple tasks. For example, the task-specific state information obtained at the block 440 may be mapped to a generic state representation that may include elements corresponding to any number of objects, rather than a rigid number of objects. For example, the general state may take the form:

$$S=\{[l_0,m_0,x_0,y_0,z_0,\text{roll}_0,\text{pitch}_0,\text{yaw}_0],\ldots,[l_n,m_n,x_n,y_n,z_n,\text{roll}_n,\text{pitch}_n,\text{yaw}_n]\}$$

In some embodiments, the blocks 440 and/or 450 may be performed simultaneously or cooperatively such that data which may traditionally be obtained as a task-specific state may be mapped and stored in the generic state.

At block 460, a set of generic actions may be obtained. In these and other embodiments, each action in the set of generic actions may be represented by a set of parameters. Additionally, the set of generic actions may be utilized to perform multiple tasks. In some embodiments, the set of generic actions may be obtained by a user programming the robotic device to perform the generic actions. As another example, the set of generic actions may be retrieved from a third party computing device. As an additional example, the set of generic actions may be obtained by retrieving the set of actions from a storage device. In some embodiments, the set of generic actions may include a "pick" action, a "place" action, a "shift" action, a "rotate" action, a "screw" action, and a "do nothing" action.

At block 470, the general state may be processed to solve for the set of variables associated with at least one of the actions. For example, the computing device and/or the robotic device may use a neural network to predict what the next action is to get to a next state in the progression towards ultimate completion of a given task. In these and other embodiments, the neural network may be programmed as an LSTM network and may vary the values of the parameters for each of the actions for each of the objects to predict a next action. In these and other embodiments, the LSTM network may determine a highest probability of a given action for a given object as the next action to progress towards completion of the task. In some embodiments, such processing may be based on a supervised learning method or a reinforcement learning method.

In some embodiments, the processing of the block 470 may take as input each element of the generic state representation (although one or more components, such as a mesh, of one or more of the elements may not be utilized) and may output a probability for each action of the generic set of actions for each object. Additionally or alternatively, the processing may output a predicted set of parameters associated with the actions.

At block 480, a collision analysis may be performed based on the next action. For example, using the meshes of the objects and the generic state representation of the current location of the objects, an analysis may be performed on the next action and associated object to determine whether or not performing the next action results in a collision of the object of the next action with another object. If there is a collision, the method 400 may return to block 470 to perform additional processing with a penalty on the action identified as the next action. If there is no collision, the method 400 may continue to the block 490.

At block 490, the next action may be performed using the set of parameters solved for. In these and other embodiments, the computing device and/or the robotic device may capture a state of the objects at the completion of the next action and may iterate over at least portions of the method 400 to determine successive actions that may ultimately result in completion of the task. In some embodiments, rather than physically performing the next action by the robotic device, the computing device may model performance of the next action and iteratively repeating such modeling until the entire succession of actions for the task may be determined.

Modifications, additions, or omissions may be made to the method 400 without departing from the scope of the present disclosure. For example, the operations of the method 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 5:
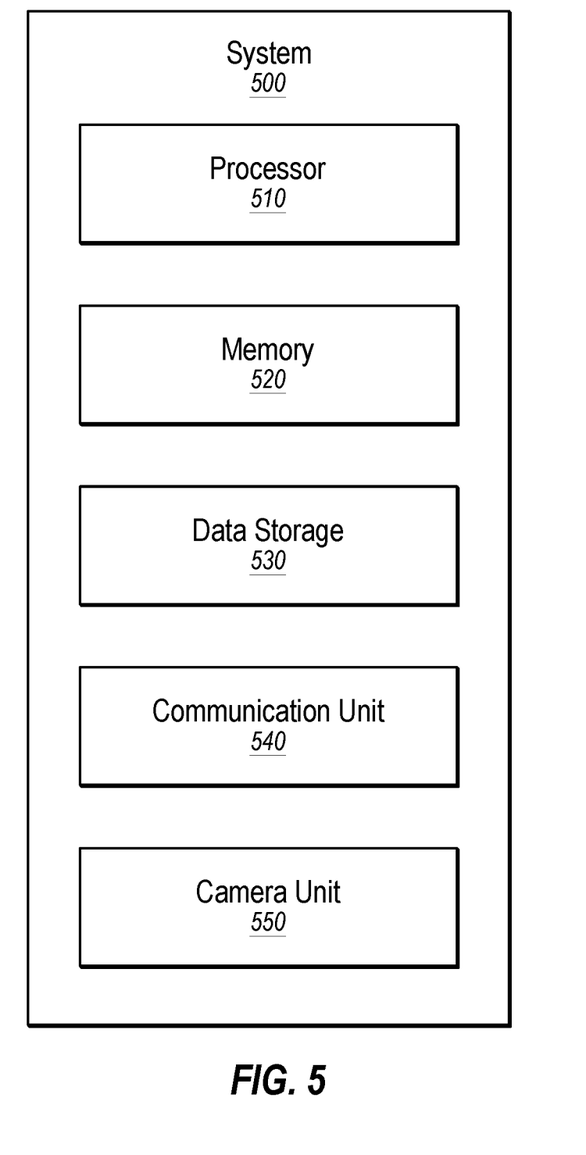
FIG. 5 illustrates an example computing system.

FIG. 5 illustrates an example computing system 500, according to at least one embodiment described in the present disclosure. Any of the devices of FIG. 1, including the robotic device 110 and the computing device 130, may be implemented as a computing system such as the computing system 500. The system 500 may include any suitable system, apparatus, or device configured to communicate over a network. The computing system 500 may include a processor 510, a memory 520, a data storage 530, a communication unit 540, and/or a camera unit 550, which all may be communicatively coupled.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform the method 400 of FIG. 4, respectively. For example, the processor 510 may obtain instructions regarding learning and/or performing actions and/or tasks by a robotic device.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 700 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

The camera unit 550 may include any device, system, component, or combination thereof configured to capture image data and/or otherwise identify locations of objects. For example, the camera unit 550 may include any kind of camera (including a video, digital, or analog camera), an infrared scanner, a laser scanner, a charge-coupled device (CCD) sensor, a complementary metal-oxide-semiconductor (CMOS) sensor, or any other photosensor.

Modifications, additions, or omissions may be made to the system 500 without departing from the scope of the present disclosure. For example, the data storage 530 may be multiple different storage mediums located in multiple locations and accessed by the processor 510 through a network.

As indicated above, the embodiments described in the present disclosure may include the use of a special purpose or general purpose computer (e.g., the processor 510 of FIG. 5) including various computer hardware or software modules, as discussed in greater detail below. Further, as indicated above, embodiments described in the present disclosure may be implemented using computer-readable media (e.g., the memory 520 or data storage 530 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    obtaining an initial task-specific state of a robotic device system associated with performing a task by a robotic device on a task-specific number of objects of the robotic device system;
    mapping the initial task-specific state to a general state of the robotic device system, the general state applicable to a plurality of tasks, the general state including a variable number of elements corresponding to a variable number of objects, the variable number of objects able to deviate from the task-specific number of objects;
    obtaining a set of generic actions each represented by a set of parameters, the set of generic actions used to perform the plurality of tasks;
    in response to each state between the initial task-specific state and a goal state being unknown, predicting, using a machine learning model, a next state of the robotic device system, the next state leading towards the goal state associated with completion of a task associated with the initial task-specific state of the robotic device;
    processing the general state of the robotic device to solve for the set of parameters and to predict a next action in performing the task, the next action selected from the set of generic actions, the next action facilitating the robotic device system to transition from the initial task-specific state to the predicted next state; and
    performing the next action using the set of parameters solved for.

2. The method of claim 1, wherein the elements of the general state each include a vector.

3. The method of claim 2, wherein the vectors of the elements of the general state include a label, a three-dimensional position, and an orientation of an object.

4. The method of claim 1, wherein obtaining the set of generic actions includes creating a set of low level actions parameterized by a respective set of the sets of parameters, each of the low level actions configured to be performed on an object.

5. The method of claim 1, wherein processing the general state includes modeling the general state using an LSTM network such that the general state may be correlated with the set of generic actions.

6. The method of claim 5, wherein weights of the LSTM network are assigned randomly during initialization of the LSTM network.

7. The method of claim 1, further comprising:
    performing an object collision analysis on an object upon which the next action is to be performed to determine whether the object will collide with another object during performance of the next action; and
    wherein the performance of the next action is based on a determination that the object will not collide with any other object during performance of the next action.

8. The method of claim 1, wherein the set of generic actions includes a pick action, a place action, a shift action, a rotate action, and a screw action.

9. The method of claim 1, wherein obtaining the initial task-specific state of the robotic device includes:
    receiving user-directed commands associated with operating the robotic device to perform the task; and
    capturing a task-specific state associated with the performance of the task at the initial task-specific state and the goal state.

10. The method of claim 1, further comprising:
    obtaining image data from a camera sensor of the robotic device; and
    identifying each of a plurality of objects in the image data;
    wherein each of the elements of the general state corresponds to one of the plurality of objects and the general state includes one element for each of the plurality of objects.

11. A non-transitory computer-readable medium containing instructions that, when executed by a processor, cause a device to perform operations, the operations comprising:
- obtain an initial task-specific state of a robotic device system associated with performing a task by a robotic device on a task-specific number of objects of the robotic device system;
- map the initial task-specific state to a general state of the robotic device system, the general state applicable to a plurality of tasks, the general state including a variable number of elements corresponding to a variable number of objects, the variable number of objects able to deviate from the task-specific number of objects;
- obtain a set of generic actions each represented by a set of parameters, the set of generic actions used to perform the plurality of tasks;
- in response to each state between the initial task-specific state and a goal state being unknown, predict, using a machine learning model, a next state of the robotic device system, the next state leading towards the goal state associated with completion of a task associated with the initial task-specific state of the robotic device;
- process the general state of the robotic device to solve for the set of parameters and predict a next action in performing the task, the next action selected from the set of generic actions, the next action facilitating the robotic device system to transition from the initial task-specific state to the predicted next state; and
- perform the next action using the set of parameters solved for.

12. The non-transitory computer-readable medium of claim 11, wherein the elements of the general state each include a vector.

13. The non-transitory computer-readable medium of claim 12, wherein the vectors of the elements of the general state include a label, a three-dimensional position, and an orientation of an object.

14. The non-transitory computer-readable medium of claim 11, wherein obtaining the set of generic actions includes creating a set of low level actions parameterized by a respective set of the sets of parameters, each of the low level actions configured to be performed on an object.

15. The non-transitory computer-readable medium of claim 11, wherein processing the general state includes modeling the general state using an LSTM network such that the general state may be correlated with one of the set of generic actions.

16. The non-transitory computer-readable medium of claim 15, wherein weights of the LSTM network are assigned randomly during initialization of the LSTM network.

17. The non-transitory computer-readable medium of claim 16, the operations further comprising:
- perform an object collision analysis on an object upon which the next action is to be performed to determine whether the object will collide with another object during performance of the next action; and
- wherein the performance of the next action is based on a determination that the object will not collide with any other object during performance of the next action.

18. The non-transitory computer-readable medium of claim 11, wherein the set of generic actions include a pick action, a place action, a shift action, a rotate action, and a screw action.

19. The non-transitory computer-readable medium of claim 11, wherein obtaining the initial task-specific state of the robotic device includes:
- receiving user-directed commands associated with operating the robotic device to perform the task; and
- capturing a task-specific state associated with the performance of the task at the initial task-specific state and the goal state.

20. The non-transitory computer-readable medium of claim 11, the operations further comprising:
- obtaining image data from a camera sensor of the robotic device; and
- identifying each of a plurality of objects in the image data;
- wherein each of the elements of the general state corresponds to one of the plurality of objects and the general state includes one element for each of the plurality of objects.

* * * * *